US008257767B2

(12) United States Patent  
Ware (10) Patent No.: US 8,257,767 B2  
(45) Date of Patent: Sep. 4, 2012

(54) DESICCATION APPARATUS AND METHOD

(76) Inventor: Gerald J. Ware, Vacaville, CA (US)

( * ) Notice: Subject to any disclaimer, the term of this patent is extended or adjusted under 35 U.S.C. 154(b) by 0 days.

(21) Appl. No.: 12/016,137

(22) Filed: Jan. 17, 2008

(65) Prior Publication Data

US 2008/0181993 A1    Jul. 31, 2008

Related U.S. Application Data

(62) Division of application No. 09/963,360, filed on Sep. 24, 2001, now abandoned.

(60) Provisional application No. 60/235,066, filed on Sep. 25, 2000.

(51) Int. Cl.  
*A23B 7/02* (2006.01)

(52) U.S. Cl. ........ 426/238; 426/465; 426/471; 426/520; 34/279; 34/334; 34/347; 34/431; 34/434

(58) Field of Classification Search .......... 426/237–238, 426/443, 465–467, 469, 520, 471; 34/279, 34/329–330, 332–335, 343, 345, 347, 356, 34/359, 367–368, 370, 431, 434, 305, 519

See application file for complete search history.

(56) References Cited

U.S. PATENT DOCUMENTS

| | | | | |
|---|---|---|---|---|
| 2,390,167 A | * | 12/1945 | Patrick, Jr. et al. | 159/3 |
| 3,063,848 A | * | 11/1962 | Van Gelder | 426/238 |
| 3,214,844 A | | 11/1965 | Oates et al. | |
| 3,253,344 A | * | 5/1966 | Van Gelder | 34/289 |
| 3,402,479 A | | 9/1968 | Hohm et al. | |
| 3,419,062 A | * | 12/1968 | Huysmans | 159/47.1 |
| 3,531,095 A | * | 9/1970 | Frans | 34/81 |
| 3,594,918 A | | 7/1971 | Quester et al. | |
| 3,630,501 A | * | 12/1971 | Shabaker | 432/14 |
| 3,859,734 A | * | 1/1975 | Wahlgren | 34/345 |
| 3,898,745 A | * | 8/1975 | Carlsson | 34/332 |
| 4,038,021 A | | 7/1977 | Benson | |
| 4,334,366 A | | 6/1982 | Lockwood | |
| 4,419,834 A | | 12/1983 | Scott | |
| 4,569,658 A | | 2/1986 | Wiggins et al. | |
| 4,609,430 A | * | 9/1986 | Okamoto | 159/29 |
| 5,522,156 A | | 6/1996 | Ware | |
| 5,911,488 A | | 6/1999 | Geromini et al. | |
| 6,000,144 A | * | 12/1999 | Bussmann et al. | 34/332 |
| 6,079,120 A | * | 6/2000 | Ekberg et al. | 34/401 |
| 6,125,549 A | * | 10/2000 | Pikus | 34/267 |

(Continued)

FOREIGN PATENT DOCUMENTS

DE          3934500 A        4/1991

(Continued)

*Primary Examiner* — Drew E Becker  
(74) *Attorney, Agent, or Firm* — Taylor English Duma LLP (57) ABSTRACT

A desiccating device and method providing variable drying conditions allowing the desiccated material to substantially maintain its natural characteristics upon rehydration as well as have a low microbial content. The method provides a process of subjecting the material to ultrasound and flowing hot air or gas for a defined period of time. The ultrasonic frequency, temperature, air flow and time of exposure can be varied to produce the most efficient drying conditions depending on the material to be dried. The apparatus has plurality of drying chambers with forced heated air or gas input and output ducts and ultrasonic emitter. The material passes through each chamber at a pre-determined rate on a perforated conveyor belt in one embodiment of the invention. Optionally, the material may be placed on a drying bed or substrate comprising a number of spheres.

9 Claims, 7 Drawing Sheets

U.S. PATENT DOCUMENTS

| | | | |
|---|---|---|---|
| 6,163,980 A * | 12/2000 | Van Poppel et al. | 34/356 |
| 6,233,844 B1 | 5/2001 | Juarez et al. | |
| 6,523,276 B1 | 2/2003 | Meldrum | |
| 7,574,816 B2 * | 8/2009 | Shivvers | 34/333 |

FOREIGN PATENT DOCUMENTS

| | | |
|---|---|---|
| JP | 09113132 A | 5/1997 |
| RU | 2088096 C1 | 8/1997 |
| WO | 96/35340 A1 | 11/1996 |

* cited by examiner

DESICCATION APPARATUS AND METHOD

CROSS-REFERENCE TO RELATED APPLICATIONS

This is a divisional application from copending U.S. patent application Ser. No. 09/963,360 filed on Sep. 24, 2001, incorporated herein by reference in its entirety, which claims priority from U.S. provisional application Ser. No. 60/235,066 filed on Sep. 25, 2000 incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to dehydration devices and methods and more particularly to a desiccation method and apparatus with multiple dehydration zones utilizing ultrasound, heated circulating air and a substrate matrix.

2. Description of the Background Art

The preservation of food and other organic and inorganic material by the evaporation of water from the material is well known in the art. Dehydration allows food to be kept for longer periods of time without refrigeration. The size and weight of the food is reduced by dehydration and the cost of transportation and storage of the food is therefore minimized.

Early methods of dehydration consisted of placing whole or diced food articles on trays and setting the trays in the sun for several days to allow the food to dry. This method proved to be undesirable on a commercial level because of the accumulation of dust, molds and other air-borne particles on the food as well as the discoloration of the food that often occurs upon exposure of food to ultra-violet light. Furthermore, microbial levels in sun-dehydrated foods were often unpredictable and unacceptable with these early methods.

Mechanical kiln type dehydrating devices that isolated the food from sunlight and outside air were then developed. These devices passed heated air through perforated trays until the water content of the food particles was reduced to a desired level. However, these methods did not appreciably change the presence of microbiological contaminants in many dehydrated foods, particularly those that were dried at relatively low temperatures for comparatively long periods of time.

Although an improvement over sun dehydration, the kiln type dehydration devices still produce discolored foods in many instances due in part to the length of time required to dry the foods. In order to preserve the natural color and texture, many dehydrated fruits were treated with sulfur dioxide, sulfites or other chemical preservatives. For many people, the taste of the preservatives made the treated foods undesirable. For others, the preservatives posed a health risk leading to legislation limiting the amount and types of preservatives that could be present in various dehydrated foods.

Later methods sought to eliminate enzyme activity and reduce the levels of bacteria and the like by blanching the food with steam or hot water and then drying the food at high temperature. Unfortunately, blanching may alter the flavor and texture of some foods and may make other foods difficult to dehydrate because the food absorbs water during the blanching process. Likewise, some foods are sensitive to exposure to heat. High drying temperatures may also adversely affect the color and flavor of dehydrated foods. Furthermore, blanching methods are not always effective in consistently reducing the microbial levels to acceptable levels.

Recently developed methods of dehydration include treating the food with an osmotic agent and then dehydrating the food with heated air. Still other methods use heated vegetable oil and treatment in reduced pressure environments. These methods are unsatisfactory due to the residues left by the treating agents as well as the expense of production.

Substantially microbe free dehydrated foods have been produced by "freeze-drying" methods known in the art. Fruit and vegetable products are typically frozen and the water removed by sublimation in a low-pressure environment with these methods. The cost of high capacity refrigeration systems and low-pressure systems, as well as the cost of energy and maintenance, makes the resulting food product expensive to manufacture using these methods.

Some seasonal vegetables, such as onions and bell peppers have a limited market life. For example, onions that are beyond certain size limits are often tilled under in the field or composted because the onions cannot be brought to market during the season. As much as twenty-five percent of the yearly onion crop may be wasted in this manner.

Only a small percentage of onions are currently dehydrated because of the difficulty experienced dehydrating onions using current methods. Presently, yellow onions may be frozen to preserve the onion until the onions can be processed. In addition, diced pieces of onion do not dry well because the pieces tend to stick together due to the sugar content of the onion thereby creating pockets of moisture. Bacteria are found in such moisture pockets requiring the destruction of the onion pieces resulting in additional waste and expense.

Materials other than food, such as medicinal herbs, may be prepared using dehydration to provide material for encapsulation or the like. Dehydration may also be used in the processing of sludge or other organic matter as well as inorganic matter. Accordingly, the principal challenge to current desiccation methods is to generate a dehydrated product with natural colors, textures and flavors that is free from microbiological contamination and noxious residues. Thus, there is a need for an effective and cost efficient desiccating apparatus and method that can maintain the natural color, flavor and texture of the food while keeping the microbial level within acceptable limits without using additives or preservatives or costly desiccation machinery and methods. The present invention satisfies these needs, as well as others, and generally overcomes the deficiencies found in existing equipment and methods.

BRIEF SUMMARY OF THE INVENTION

The present invention is a material desiccation apparatus and associated method for producing dehydrated vegetables and the like, that are substantially free of microbiological contaminants and retain the natural color, flavor and texture of the vegetable upon rehydration. The apparatus and method are particularly suited for dehydrating vegetables such as onions that discolor using current methods known in the art. However, the apparatus and method may also be used to dehydrate non-food materials such as sludge as well as inorganic materials.

By way of example, and not of limitation, the inventive method comprises circulating a heated gas, such as air, over prepared and sized food material, and optionally subjecting the material to ultrasonic sound waves, until the moisture content of the material is preferably reduced to approximately 5% to 10% of its original content. The time of exposure, the ultrasonic wavelength, the volume of gas, rate of gas flow, and the temperature of the circulating gas can be varied in single or multiple stages to control the overall rate of desiccation of the material. In this way, the conditions and rate of desiccation and can be tailored to the characteristics and type of food or other material to be dehydrated. The exposure of the material to ultrasound and the exposure to circulating gas are preferably done simultaneously. However, the exposures may also be done in close succession.

The preferred method of using the apparatus of the present invention, applied to onions for example, will have at least one stage and preferably three dehydration stages. While the preferred method has three stages, it will be seen that any number of stages can be utilized.

In the preferred first stage, the prepared and sized onions are simultaneously subjected to ultrasound, preferably at frequencies within the range of approximately 20 KHz to approximately 100 KHz, and circulating heated air at a temperature within the range of approximately 190° F. to approximately 200° F. for a period of approximately 13 to approximately 15 minutes. The flow of air is preferably approximately 240 cubic feet per minute per square foot of drying bed in the first stage. The ultrasonic emissions may be continuous or pulsed.

During the second stage, the onions are exposed to ultrasound at frequencies within the range of approximately 20 KHz to approximately 100 KHz and circulating heated air at a temperature within the range of approximately 170° F. to approximately 180° F. for a period of approximately 13 to approximately 15 minutes. The flow of air is preferably approximately 180 cubic feet per minute per square foot of drying bed in the second stage.

In the third and final stage, the onions are subjected to ultrasound at frequencies within the range of approximately 20 KHz and approximately 100 KHz and circulating heated air at a temperature within the range of approximately 150° F. to approximately 160° F. for a period of about 60 minutes or as needed to bring the water content of the onion pieces to approximately 5% by weight. The preferred airflow is around 150 cubic feet per minute per square foot of drying bed in this example.

While the method is tailored for onions as an example, it will be understood that the temperature, ultrasonic frequencies, number of stages, volume of circulating gas and time of exposure may be varied in each stage depending on the type of material to be dehydrated. Additionally, the use of ultrasound is optional and its use, as well as the stages in connection with which ultrasound is used, can vary depending on the particular product being dried.

Accordingly, the apparatus of the present invention generally comprises a drying chamber having an optional ultrasound generator along with intake and output ducts to allow heated air to circulate in and through the chamber and out of the chamber. The food material is preferably placed on a substrate comprising a plurality of spheres. Although the spherical shape is preferred, it will be understood that any shape substrate may be used.

The preferred embodiment has an elongate enclosure with a number of vertical partitions defining three drying chambers. Each drying chamber has an ultrasound emitter and air intake and output ductwork. A horizontal, perforated conveyor belt, preferably with a number of vertical vanes, runs longitudinally through the enclosure and partitions. The endless conveyor belt is preferably motorized.

The spheres and food material are placed between the vertical vanes of the conveyor belt to a depth of about 24 inches or less. Alternatively, the spheres and food material may be placed in a perforated container. The ultrasound emitter and intake duct in each drying chamber are preferably positioned below the perforated conveyor belt and the output duct above the conveyor.

In use, the spheres with the food material advance along the perforated conveyor to the enclosure and the first drying chamber. Heated air is brought through the intake duct and forced through the perforated belt, around the spheres and the food particles to the upper section of the chamber and out through the output duct. After a defined period of time, the belt advances through a partition into the second drying chamber. The second and third drying chambers are preferably configured in the same manner as the first drying chamber. However, the temperature of the input air and the frequency of the ultrasound and the time of exposure may be different from chamber to chamber. Optionally, the air intake of the second drying chamber may be joined to the intake duct of the third drying chamber, and so on, to conserve the heat.

After exiting the enclosure, the spheres are removed from the conveyor belt and the desiccated food material is separated from the spheres and thereafter prepared for packaging. In one embodiment, the spheres and dried food particles are placed on a vibrating perforated table to separate the spheres from the dehydrated material.

An object of the invention is to provide an apparatus and method to efficiently dehydrate material without being required to blanch, freeze or treat the material with preservatives.

Another object of the invention is to provide a modular, multi-stage desiccating apparatus that can efficiently and economically dehydrate material by subjecting the material to ultrasound and a circulating heated gas in each stage.

A further object of the present invention is to provide a desiccating apparatus and method that will greatly reduce bacteria and other microbial levels without significantly affecting the flavor, texture and other characteristics of the dehydrated materials upon rehydration.

Another object of the invention is to provide a device that has variable desiccating conditions that can be adapted to provide a range of dehydration rates allowing the efficient dehydration of a variety of foods and other materials.

Yet another object of the invention is to provide a support substrate that supports the material to be dehydrated to allow faster and more efficient dehydration than found in conventional dehydration devices.

Further objects and advantages of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings, which are for illustrative purposes only.

DETAILED DESCRIPTION OF THE INVENTION

Referring more specifically to the drawings, for illustrative purposes the present invention is embodied in the apparatus generally shown in FIG. 1 through FIG. 7, where like reference numbers denote like parts. It will be appreciated that the apparatus may vary as to configuration and as to details of the parts, and that the method may vary as to the specific steps and sequence, without departing from the basic inventive concepts disclosed herein.

Figure 1:
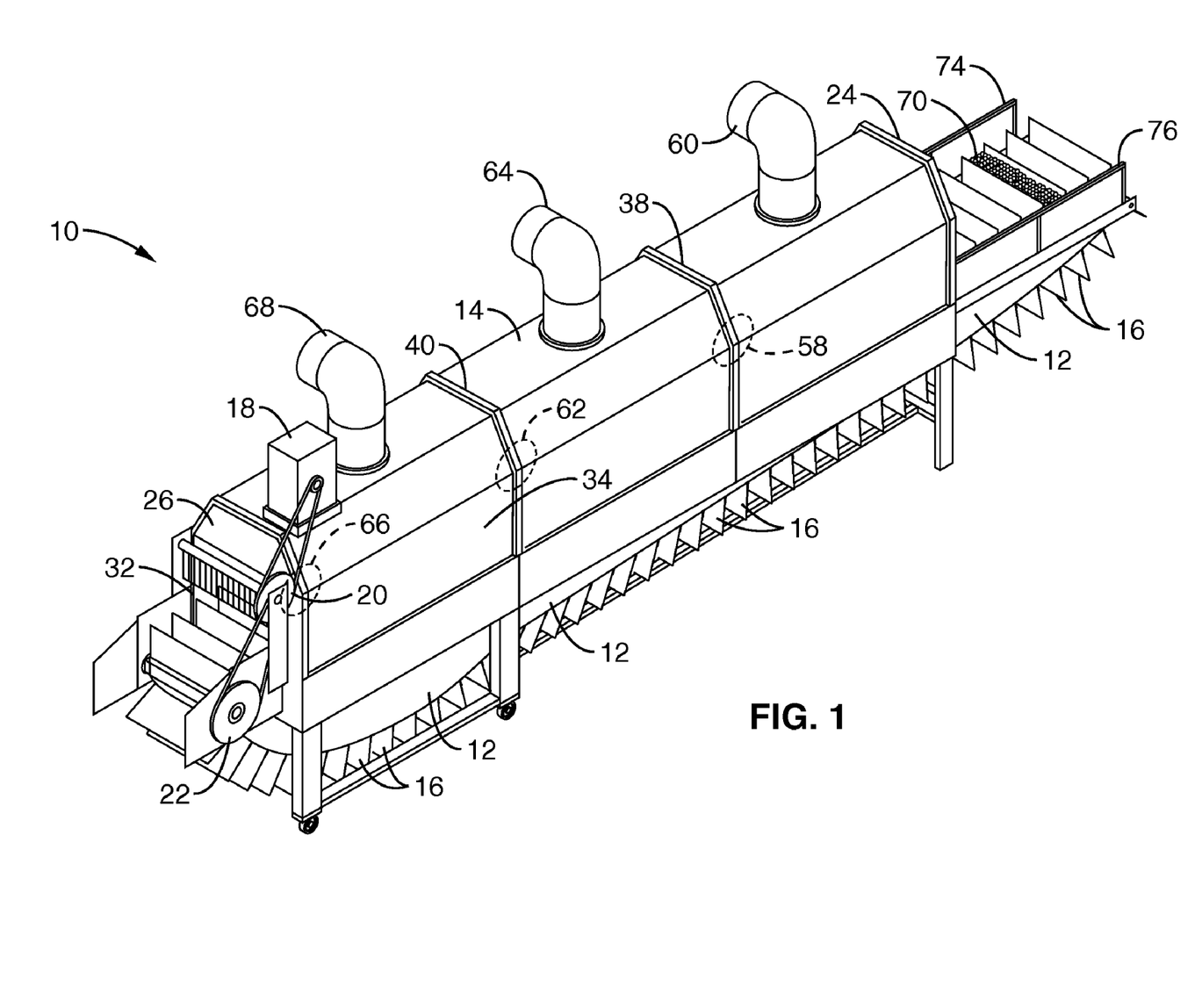
FIG. 1 is a perspective view of an embodiment of a desiccating apparatus according to the present invention having three stages.

Referring first to FIG. 1, the desiccation apparatus 10 according to the present invention preferably comprises multiple linearly arranged drying chambers through which an endless horizontal conveyor belt 12 generally moves in one direction. These drying chambers are essentially stages or zones in an enclosure 14 through which the material to be dried can pass. Three stages are provided in the embodiment shown in FIG. 1.

Conveyor belt 12 may optionally have vertical vanes 16 that are generally perpendicular to the horizontal plane of the belt 12. A motor 18 is mounted to enclosure 14 and provides motion to the conveyor belt 12 at variable speeds as needed. Motor 18 may have step down gearing with a first sprocket 20 and a second sprocket 22 to regulate the rate of advancement of conveyor belt 12 through the enclosure 14. The conveyor belt 12 may quickly advance through each stage at designated time points or may alternatively move very slowly through the stages when the desired time of exposure of the material in each stage is essentially the same.

Enclosure 14 has a front entry panel 24 and a rear exit panel 26. The front and rear panels 24, 26 extend vertically from the top of the enclosure to just above the tip of the vanes 16 of the conveyor belt 12 so as not to interfere with the passage of the belt 12 through the interior of enclosure 14. The front and rear panels 24, 26 may be made of rigid steel or, alternatively, flexible plastic and are configured to reduce the flow of air into or out of the enclosure 14 through the place of entry or exit of conveyor belt 12 from the enclosure 14.

Figure 2:
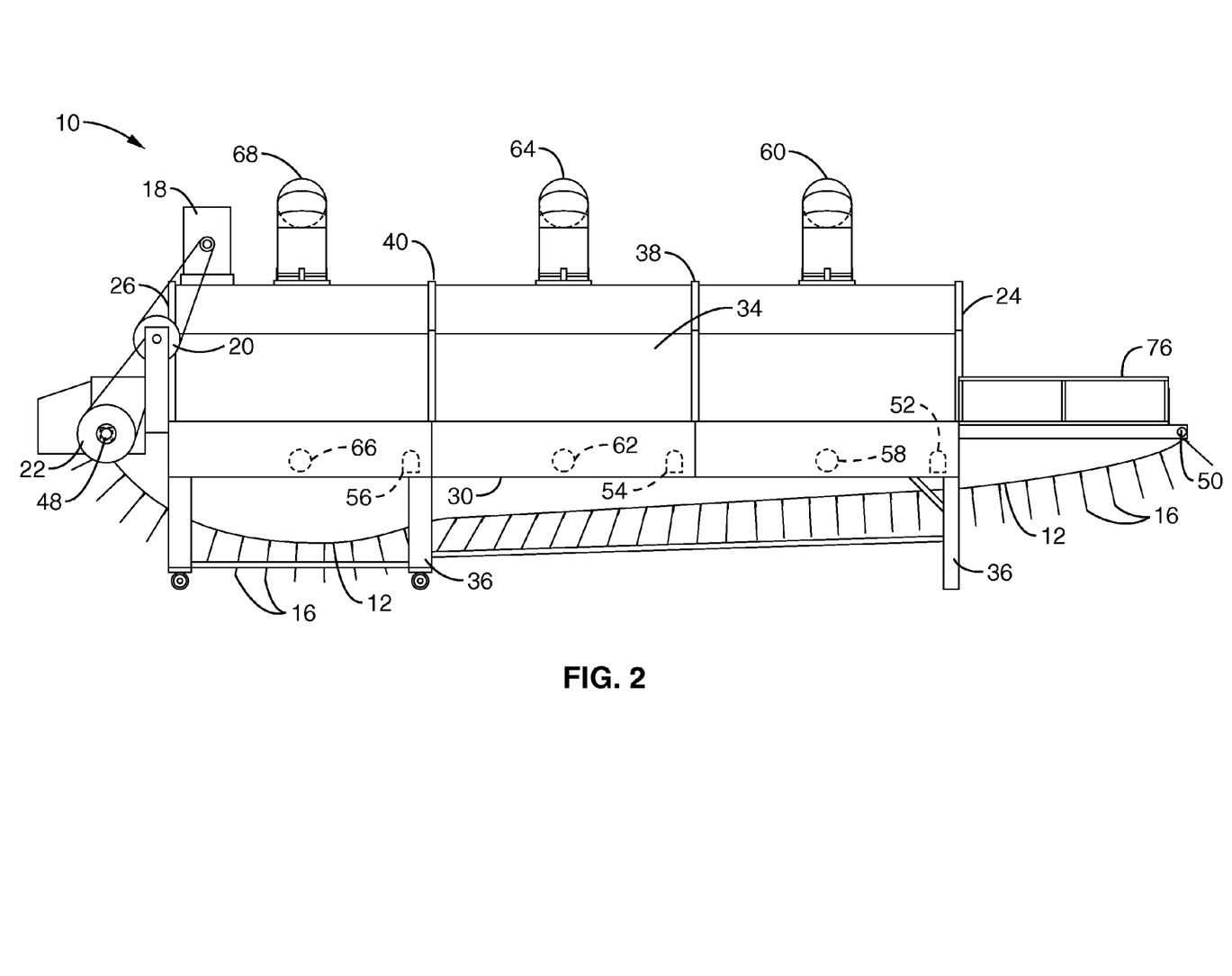
FIG. 2 is a side view of the desiccating apparatus of FIG. 1 showing the vaned conveyor belt configuration.
Figure 3:
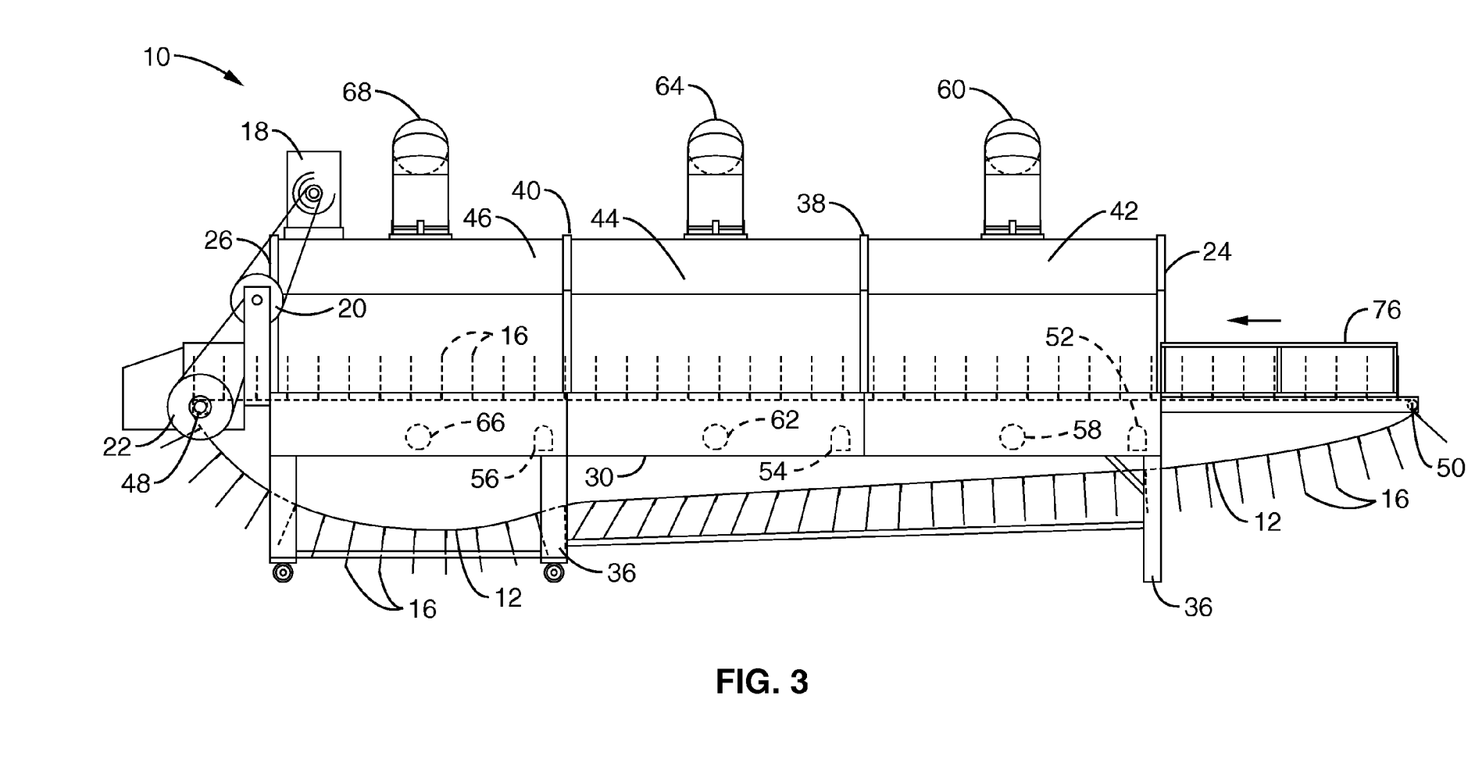
FIG. 3 is a side view of the desiccating apparatus of FIG. 1 with intake ducts, ultrasound emitters and belt portions depicted in dashed lines.

Referring also to FIG. 2 and FIG. 3, it can be seen that enclosure 14 has a top wall 28, and a bottom or floor 30 that is supported by a left sidewall 32, and a right side wall 34. The enclosure 14 and conveyor belt 12 are preferably supported by a plurality of support legs 36 to position belt 12 at a level that will allow a worker to place materials on conveyor belt 12 without bending over.

Referring particularly to FIG. 2, in the embodiment shown the interior of enclosure 14 is divided by inner vertical partitions 38 and 40 to define discrete drying chambers. Partition 38 forms a first drying chamber 42. Partition 40 forms a second drying chamber 44 and a third drying chamber 46 within enclosure 14. Both partitions 38 and 40 have an opening to allow conveyor belt 12 and vanes 16 to move freely through drying chambers 42, 44 and 46. Conveyor belt 12 advances horizontally through enclosure 14, around a powered roller 48, below floor 30 and between the support legs 36 to trailing roller 50. Alternatively, a perforated container or platform (not shown) may be used instead of the vanes 16 of perforated conveyor 12 to hold the material to be dehydrated.

Drying chamber 42 has an ultrasound emitter 52 preferably positioned below conveyor belt 12 at or near bottom wall 30 of enclosure 14. Likewise, the second and third drying chambers 44, 46 have ultrasound emitters 54 and 56 respectively positioned below belt 12 within enclosure 14.

Each drying chamber preferably has discreet intake and output ducts that allow heated air or gas to be directed through each drying chamber. The volume and rate of flow of gas through each of the input ducts for each chamber can be varied.

Intake duct 58 is positioned below conveyor belt 12 in the first drying chamber 42. Conveyor belt 12 is preferably perforated to allow air to flow through the belt. Output duct 60 is preferably positioned at the top of wall 28 of the enclosure and first drying chamber 42. Likewise, the second drying chamber 44 has input duct 62 and output duct 64 and the third drying chamber 46 has input duct 66 and output duct 68 in similar configuration to the ducts of the first drying chamber 42. While the input ducts and ultrasound emitters are preferably placed below the perforated conveyor belt 12, it will be understood that the ultrasound emitters 52, 54, and 56 can be placed above the conveyor belt 12 and the air flow can come from either above, below or to the side of belt 12 depending on the placement of input ducts 58, 60 and 62. It can be seen that enclosure 14 is modular. One or more drying chambers can be sequentially added as needed to the first drying chamber, each chamber having input and output ducts and, optionally, an ultrasound emitter. The chambers may be contiguous as in the embodiment shown or independent of the other chambers.

The temperature of the air or gas that enters each drying chamber 42, 44, 46 can be raised by heating the intake air or gas using a furnace or other methods known in the art and commercially available. The gas or air is forced through the furnace elements and heated in this embodiment. The air then proceeds into the first drying chamber 42 and is then preferably drawn out of the chamber by a number of fans known in the art. The fans should be capable of moving volumes of air from approximately 150 to approximately 450 cubic feet per minute per square foot through the drying chambers 42, 44 and 46. The volume of air directed through each drying chamber can be increased or decreased to influence the overall rate of dehydration by the apparatus.

For drying certain materials, it may be desirable to use a heated inert gas such as Nitrogen as a medium rather than heated air to reduce the amount of oxidization of the material. Accordingly, the system could be closed and the inert gas recycled without departing from the scope of the invention.

To conserve heat, a heat exchanger known in the art (not shown) may be associated with output duct 60, as well as associated air ducts, to transfer heat from the air exiting the first drying chamber 42 to the incoming air of the second drying chamber 44 through intake duct 62. Heat exchangers may also be associated with each output duct from each drying chamber to heat the air or gas entering the input ductwork of each drying chamber.

Figure 4:
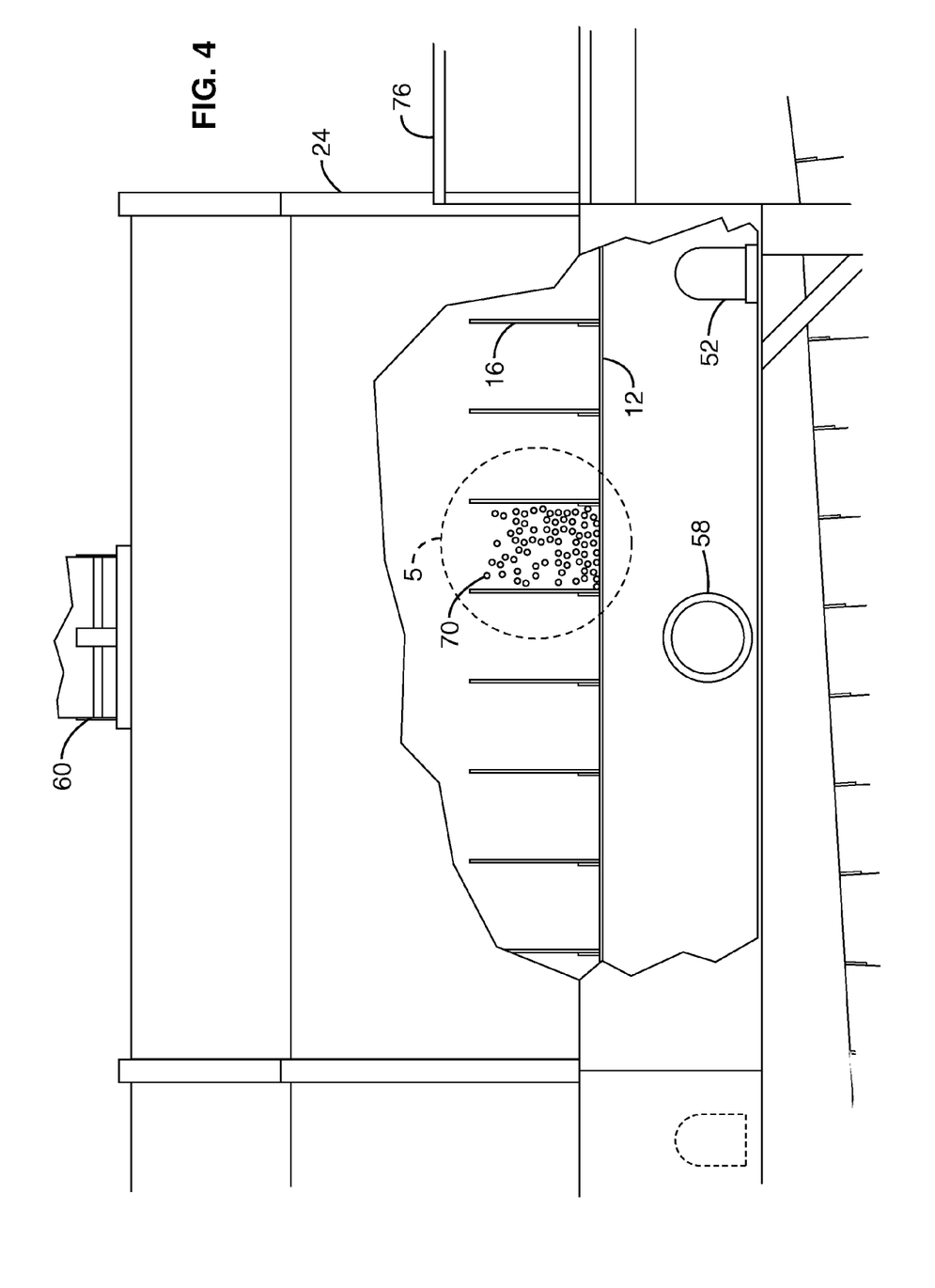
FIG. 4 is a detailed partial interior side view of the first stage of the desiccation apparatus of FIG. 1 shown with the support substrate in one section of the drying bed.
Figure 5:
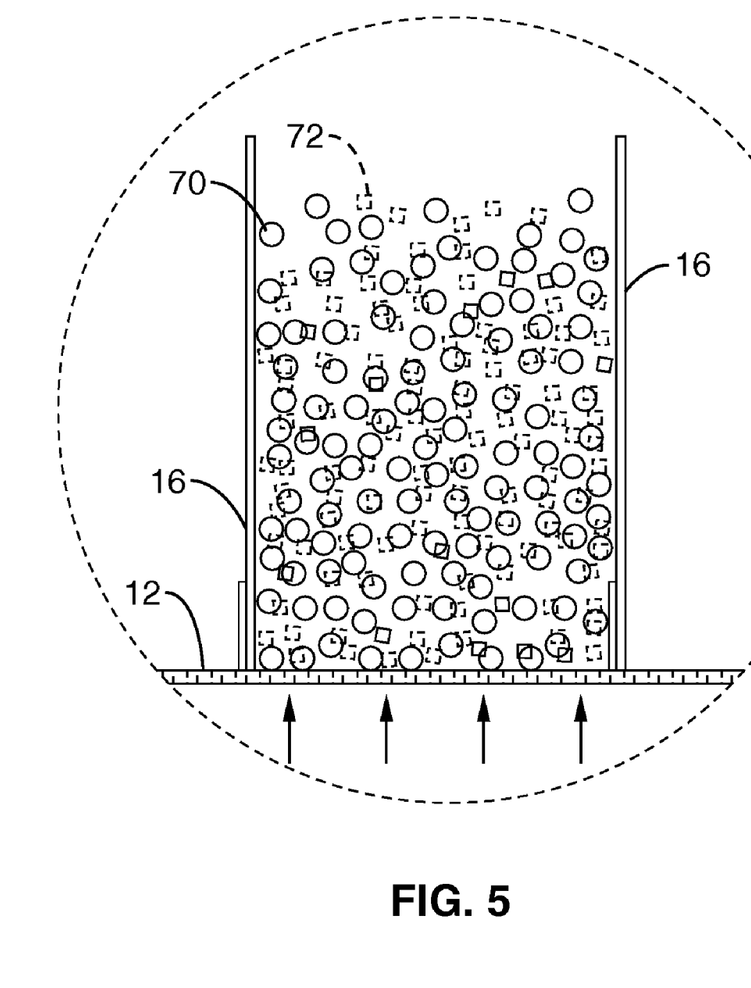
FIG. 5 is a detailed side view of one section of the drying bed shown in FIG. 4.

Referring also to FIG. 4 and FIG. 5, the invention preferably includes a drying bed that utilizes a support substrate. The support substrate preferably comprises a plurality of spheres 70 held within vertical vanes 16 of conveyor belt 12 to form the drying bed. Each area between each of the vanes 16 is filled with spheres 70 and food particles 72. For clarity, FIG. 4 and FIG. 5 show only a single space filled between vanes 16. Alternatively, the spheres 70 and food particles 72 may be placed in an open container with perforated walls and bottom to support the drying bed that is placed on a perforated conveyor or other support structure.

Spheres 70 are preferably approximately % of an inch in diameter and are made of heat resistant plastic or similar material. The size of the spheres may be increased or decreased depending on the type of material that is to be desiccated and the size of the particles that are introduced into the apparatus. Food particles, or other material 72 and spheres 70 can form a drying bed of varying depths, but the bed preferably has a depth of approximately twenty-four inches or less in the embodiment shown. A drying bed of this type facilitates faster drying because the spheres separate the product and increase the exposed surface area of the product. While the drying bed is preferably composed of spheres, it will be understood that the drying bed could be composed of solids of virtually any shape. The use of spheres or balls in connection with drying materials is described in more detail in my prior patent, U.S. Pat. No. 5,522,156 issued on Jun. 4, 1996, incorporated herein by reference.

In use, food particles 72 or other items to be desiccated are mixed with spheres 70 and placed on a loading section of perforated conveyor belt 12 within sectioned areas formed by vertical vanes 16 and left and right loading area sidewalls 74, 76. In the embodiment shown, belt 12 and the material to be dehydrated advance through the front entry panel 24 and into the first drying chamber 42. Heated air is brought into chamber 42 through intake duct 58 and forced through the perforations of conveyor belt 12. The air then circulates through the spaces between spheres 70 and food particles 72 and is drawn out of the chamber through output duct 60. At the same time the food particles 72 are preferably subject to pulsed or constant ultrasonic emissions from ultrasound emitter 52.

At the appropriate time, the food or other matter is conveyed from the first drying chamber 42 to the second drying chamber 44 through an access way through partition 38. Air or other heated gas enters chamber 44 through intake duct 62 and is forced through the perforated conveyor belt 12 and around spheres 70 and food particles 72 and out of the chamber through output duct 64. At the same time, the food particles 72 are exposed to ultrasonic emissions from ultrasound emitter 54. Emitter 54 may be set to emit ultrasonic waves at a different frequency from emitter 52 in the first drying chamber or may be set at the same frequency depending on the type of food material 72 to be dehydrated. The temperature and volume of the heated air or gas entering chamber 44 may also be variable.

The material then enters the third drying chamber 46 through an access way through partition 40. Heated air or gas enters the third drying chamber 46 though intake duct 66 and is forced through belt 12 around spheres 70 and food particles 72 and out through output duct 68. Emitter 56 provides pulsed or constant ultrasonic emissions to the third drying chamber 46 at desired frequencies.

Figure 6:
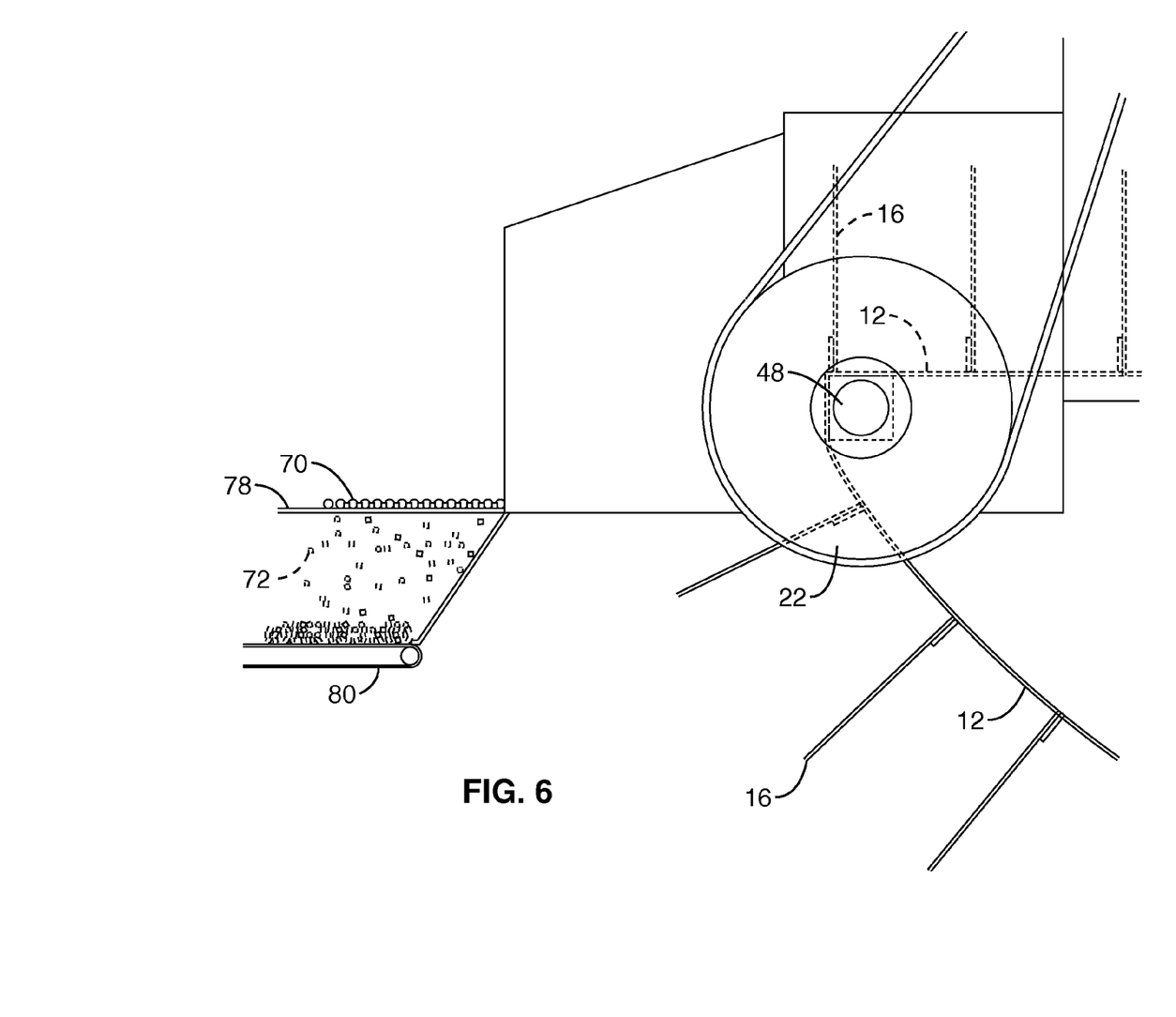
FIG. 6 is a side view of the separator portion of the apparatus shown in FIG. 1 showing the separation of the dehydrated material from the support substrate.

Finally, the materials exit the third drying chamber 46 and enclosure 14 through rear exit panel 26. Referring to FIG. 6, the dehydrated food particles 72 are separated from spheres 70 using a vibrating table 78 or other commercial separator. Spheres 70 are returned to a staging area for cleaning and mixing with new food material in the embodiment shown. The separated dehydrated food particles 72 are taken by conveyor 80 to be inspected and packaged.

Figure 7:
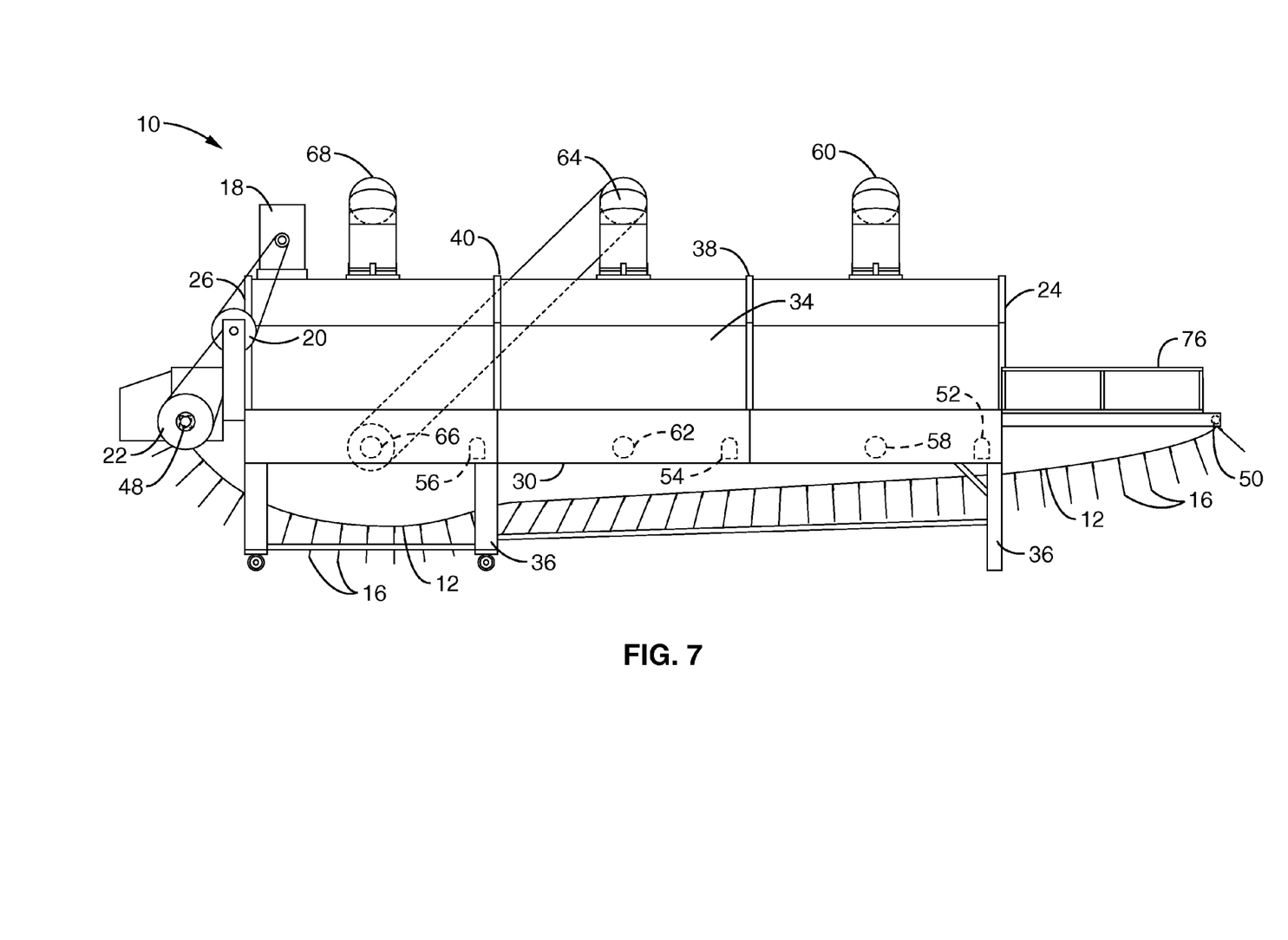
FIG. 7 is a side view of an alternative embodiment of the present invention showing the ductwork connecting the output duct of one drying chamber with the input duct of the subsequent chamber allowing heat to be conserved.

Turning now to FIG. 7, a heat conserving alternative embodiment of the present invention is shown. In this configuration, the air from the output duct of the previous drying chamber is attached to the input duct of the subsequent chamber to conserve heat. For example, output duct 64 of the second drying chamber 44 may be connected to input duct 66 of the third drying chamber 46 by a connecting pipe 82 with an optional fan. The heated air from the second drying chamber 44 is recycled through the third drying chamber 46 thereby conserving heat. However, the water content of the air exiting the first drying chamber may often be too high to effectively recycle the air from the first drying chamber 42. If this is the case, the heat must be transferred through the use of a heat exchanger.

It will be understood by one skilled in the art that the drying chambers could be separate rather than contiguous as shown in FIG. 1 through FIG. 7. For example, the time of exposure of the food particles may need to be different for each drying chamber requiring different rates of advancement for the conveyor belt. Therefore, separate belts and separate drying chambers would be used without departing from the scope of the invention.

In practicing the methods of the invention, the matter to be desiccated is initially prepared. The methods of the present invention are particularly suited for desiccation of fruits and vegetables and other plants as well as shrimp and certain cut meats. Accordingly, preparation may include washing, peeling, cutting, dicing, and precooking and the like depending on the material to be dehydrated.

The prepared particulate food matter is then loaded into an apparatus that is capable of providing variable temperature, gas or airflow and pulsed or constant ultrasonic emissions over time. The temperature, rate of airflow and the frequency of ultrasonic emission and the sequence of exposures may vary depending on the type of material that is to be dehydrated. The inventive methods also contemplate that the ultrasonic frequency could be zero when the spherical support substrate 72 is utilized in appropriate circumstances. It will be seen that the variation of temperature, airflow, time of exposure as well as the frequency of the ultrasonic emissions may regulate the overall rate of desiccation.

In order to further illustrate the inventive methods of the present invention, the following non-limiting example is provided. In this example, onions are washed, peeled and diced. The prepared diced onions are preferably mixed with spheres 70 and loaded onto a perforated conveyor 12. In phase one (drying chamber 42), the onions are exposed to continuous ultrasound at a frequency of approximately 20 KHz, and to circulating heated air at a temperature between approximately 190° F. and approximately 210° F., preferably approximately 200° F. at a rate of approximately 240 cubic feet per minute per square foot of drying bed for approximately fifteen minutes. As much as 70% of the water content of the onion is removed in this phase as a result of the spherical support substrate and the ultrasound exciting the water molecules and the movement of water to the outer surface of the onion.

In phase two (drying chamber 44), the diced onion is subjected to continuous ultrasound at a frequency of approximately 20 KHz, and to circulating heated air at a temperature between approximately 170° F. and approximately 190° F., preferably approximately 180° F. at a rate of approximately 180 cubic feet per minute per square foot for approximately fifteen minutes.

Finally, In phase three (drying chamber 46), the diced onion is then subjected to continuous ultrasound at a frequency of approximately 20 KHz, and to circulating heated air at a temperature between approximately 150° F. and approximately 170° F., preferably 160° F., at a rate of approximately 150 cubic feet per minute per square foot of surface area for approximately one hour until the moisture content of the onion is approximately 5%. This level of moisture content makes the product shelf stable; that is, it will have an indefinite shelf life. The onion is then inspected and packaged.

By staging the drying process as described, the expulsion of moisture is maximized without damaging the food. As the amount of solids increases due to a reduction in moisture, the sensitivity of the food product to temperature increases. Accordingly, the drying temperature may be dropped in successive drying zones. Furthermore, by subjecting the material to ultrasonic sound waves, the water molecules in the material are excited and move to the outer surface of the material, thus allowing for more efficient drying by the circulating heated gas.

Current permissible bacterial counts in onions dehydrated using conventional means have a standard total plate count of approximately 300,000. Plate counts of 10,000, which are well below permissible levels, have been observed in onions using the apparatus and methods of the present invention.

Accordingly, it will be seen that the methods and apparatus of this invention can efficiently and swiftly desiccate food particles which are substantially free of microbial content without the need for blanching, freezing, dehydrating at low pressures, chemical treatments or other activities that may affect the color, flavor and texture of the food upon rehydration.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for desiccating materials, comprising:
   placing material in a bed formed from a plurality of generally spherical plastic supports, retained within a plurality of bins and a perforated bottom, the plurality of bins formed by a pair of sidewalls and a plurality of vertical vanes held between the pair of sidewalls, the plurality of bins each having a rectangular cross-section, the bed formed on an outer surface of an endless conveyor belt positioned at a level allowing a worker to place materials on the belt without bending over, the conveyor belt supported by support legs and held by a plurality of rollers, the plurality of bins formed continuously along the outer surface of the conveyor belt;
   advancing the bed of generally spherical plastic supports and material into a first drying chamber by turning a powered roller of the plurality of rollers, the first drying chamber including an input duct and an output duct, a heat exchanger positioned on the output duct, wherein the step of advancing the bed of generally spherical plastic supports and material into a drying chamber includes:
   circulating a heated gas at a first temperature for a first amount of time through the bed of generally spherical plastic supports and material from the input duct to the output duct, the heat exchanger on the output duct transferring heat to the gas entering the input duct;
   exposing the bed of generally spherical plastic supports and material to at least one ultrasonic frequency through at least one ultrasound emitter placed below the perforated bottom within the range of approximately 20 KHz to approximately 100 KHz for approximately fifteen minutes to approximately ninety minutes;
   advancing the bed of generally spherical plastic supports and material into a second drying chamber and a third drying chamber, the first drying chamber and the second drying chamber separated by a first partition and the second drying chamber and the third drying chamber separated by a second partition;
   separating desiccated material from the generally spherical plastic supports of the bed of generally spherical plastic supports on a perforated vibrating table;
   returning the generally spherical plastic supports to a staging area;
   cleaning the generally spherical plastic supports; and
   taking the material to be inspected and packaged.

2. A method as recited in claim 1, wherein said heated gas is circulated around said material and said supports of said bed at a rate between approximately 150 cubic feet per minute per square foot and approximately 450 cubic feet per minute per square foot.

3. A method as recited in claim 1, wherein said circulated heated gas has a temperature ranging from between approximately 150° F. to approximately 210° F.

4. A method as recited in claim 1, wherein said circulated heated gas consists of one of nitrogen and oxygen.

5. A method as recited in claim 1, further comprising circulating heated gas at a second temperature for a second period of time.

6. A method as recited in claim 5, further comprising circulating heated gas at a third temperature for a third period of time.

7. A method as recited in claim 1, further comprising exposing said material to a second ultrasonic frequency and circulating heated gas at a second temperature for a second period of time.

8. A method as recited in claim 7, further comprising exposing said material to a third ultrasonic frequency and circulating heated gas at a third temperature for a third period of time.

9. The method of claim 1, wherein said material is food.

* * * * *